United States Patent [19]
Harwit

[11] Patent Number: 5,825,525
[45] Date of Patent: Oct. 20, 1998

[54] ELECTRO-OPTIC MODULATOR WITH VOLTAGE TUNABLE QUANTUM WELL WAVEGUIDE CLADDING LAYER

[75] Inventor: Alex Harwit, Palo Alto, Calif.

[73] Assignee: Lockheed Missiles & Space Co., Sunnyvale, Calif.

[21] Appl. No.: 586,195

[22] Filed: Jan. 12, 1996

[51] Int. Cl.$^6$ ................................................. G02F 1/03
[52] U.S. Cl. ................................................ 359/248; 385/8
[58] Field of Search ................................ 359/248; 385/4, 385/5, 8

[56] References Cited

U.S. PATENT DOCUMENTS

| | | | |
|---|---|---|---|
| 5,339,370 | 8/1994 | Sano et al. | 359/245 |
| 5,608,566 | 3/1997 | Dutta et al. | 359/248 |

FOREIGN PATENT DOCUMENTS

| | | |
|---|---|---|
| 63-141379 | 6/1988 | Japan . |
| 01-178933 | 7/1989 | Japan . |

OTHER PUBLICATIONS

Betts, Gary E., et al., "High Sensitivity Lumped–Element Bandpass Modulators in LiNbO$_3$", *Journal of Lightwave Technology*, vol. 7, No. 12, Dec. 1989, pp. 2078–2083.

Bradley, P.J., et al., "Effect of Device Length and Background Doping on the Relative Magnitudes of Phase and Amplitude Modulation in GaAs/AlGaAs PIN Multiple Quantum Well Waveguide Optical Modulators", *Applied Optics*, vol. 28, No. 8, Apr. 15, 1989, pp. 1560–1564.

Butler, Jerome K. and Zoroofchi, J., "Radiation Fields of GaAs–(AlGa) As Injection Lasers", *Journal of Quantum Electronics*, vol. QE–10, No. 10, Oct. 1974, pp. 809–815.

Daryoush, Afshin S., et al., "Interfaces for High–Speed Fiber–Optic Linds: Analysis and Experiment", *IEEE Transactions on Microwave Theory and Techniques*, vol. 39, No. 12, Dec. 1991, pp. 2031–2044.

Girton, D.G., et al., "20 GHz Electro–Optic Polymer Mach–Zehnder Modulator", *Applied Physics Letters*, vol. 58, No. 16, Apr. 22, 1991, pp. 1730–1732.

(List continued on next page.)

*Primary Examiner*—Georgia Y. Epps
*Assistant Examiner*—Dawn-Marie Bey
*Attorney, Agent, or Firm*—Feix & Feix

[57] ABSTRACT

An electro-optic modulator (300) comprises a multiple quantum well core layer (320) in which the band gap and refractive index are adjusted to make the core layer (320) transparent to light at a selected wavelength and a voltage tunable, multiple quantum well cladding layer (330) in which an exciton absorption provides the cladding layer (330) with a first refractive index that is less than the core refractive index when a first voltage is applied and a second refractive index that approaches or exceeds the core refractive index when a second voltage is applied. The exciton absorption also provides the voltage tunable cladding layer (330) with a substantially greater absorption coefficient at the selected wavelength than that of the core layer (320). The core and voltage tunable cladding layers (320, 330) are combined with a second cladding layer (310) to form a waveguide in which light is confined to the low loss core layer (320) in the first voltage state and diverted into the highly absorbing voltage tunable cladding layer (330) in the second voltage state. In a preferred embodiment of the modulator (300), the multiple quantum well core and cladding layers (320, 330) comprise GaAs quantum wells and AlGaAs barriers. The small effective absorption coefficient of the core layer (320) and the large difference between this absorption coefficient and that of the voltage tunable cladding layer (330) in the off state provide a modulator (300) characterized by a higher contrast ratio and, simultaneously, a lower insertion loss than are available from conventional electro-absorption or electro-refraction based modulators.

16 Claims, 7 Drawing Sheets

OTHER PUBLICATIONS

Harwit, Alex, et al., "High Contrast Ratio $In_xGa_{1-x}As$/GaAs Multiple Quantum Well Spatial Light Modulators", *Infrared Sensors: Detectors, Electronics, and Signal Processing*, T.S. Jay Jayadev, Editor, Proc. SPIE 1541, 1991, pp. 38–47.

Hecht, E., "Optics", Addison–Wesley Publishing Company, Second Edition, pp. 340, 342.

Katz, A., et al., "Electrical and Structural Properties of Pt/Ti/$p^+$–InAs Ohmic Contacts", *Journal of Vacuum Science and Technology*, vol. B8, No. 5, Sep./Oct. 1990, pp. 1125–1127.

Kim, I., et al., "Analysis of a New Microwave Low–Loss and Velocity–Matched III–V Transmission Line for Traveling Line Traveling–Wave Electrooptic Modulators", *Journal of Lightwave Technology*, vol. 8, No. 5, May 1990, pp. 728–738.

Kressel, H. & Butler, J.K., "Semiconductor Lasers and Heterojunction LEDs", Academic Press, New York, 1977, pp. 185–247.

Miller, D.A.B., et al., "Electric Field Dependence of Optical Absorption Near the Band Gap of Quantum–Well Structures", *The American Physical Society*, vol. 32, No. 2, Jul. 15, 1985, pp. 1043–1060.

Nishihara, H., et al., "Optical Integrated Circuits", McGraw–Hill Book Company, 1985, pp. 7–18.

Nojima, S. & Wakita, K., "Optimization of Quantum Well Materials and Structures for Excitonic Electroabsorption Effects", *Applied Physics Letters*, vol. 53, No. 20, Nov. 14, 1988, pp. 1958–1960.

Pankove, J.I., "Optical Processes in Semiconductors", Dover Publications, Inc., New York, 1971, pp. 89–90.

Tumolillo, T.A. Jr., Ashley, P.R., "Multilevel Registered Polymeric Mach–Zehnder Intensity Modulator Array", *Applied Physics Letters*, vol. 62, No. 24, Jun. 14, 1993, pp. 3068–3070.

Walker, Robert G., "High–Speed III–V Semiconductor Intensity Modulators", *IEEE Journal of Quantum Electronics*, vol. 27, No. 3, Mar. 1991, pp. 654–667.

Wright, D.R., et al., "Novel Phased Array Optical Scanning Device Implemented Using GaAs/AlGaAs Technology", *Applied Physics Letters*, vol. 59, No. 8, Aug. 19, 1991, pp. 899–901.

Yablonovitch, E., et al., "Extreme Selectivity in the Lift–Off of Epitaxial GaAs Films", *Applied Physics Letters*, vol. 51, No. 26, Dec. 28, 1987, pp. 2222–2224.

Zucker, J.E., et al., "Zero–Loss Quantum Well Waveguide Mach–Zehnder Modulator at 1.55 $\mu$m", *Applied Physics Letters*, vol. 60, No. 3, Jan. 20, 1992, pp. 277–279.

Zucker, J.E., et al., "Quaternary Quantum Wells for Electro–Optic Intensity and Phase Modulation at 1.3 and 1.55 $\mu$m", *Applied Physics Letters*, vol. 54, No. 1, Jan. 2, 1989, pp. 10–12.

ELECTRO-OPTIC MODULATOR WITH VOLTAGE TUNABLE QUANTUM WELL WAVEGUIDE CLADDING LAYER

BACKGROUND OF THE INVENTION

1. Technical Field

The present invention relates to the field of electro-optic modulators, and in particular to electro-optic waveguide modulators formed from quantum well materials.

2. Background Art

Electro-optic modulators (EOM) employ electric fields to control the propagation of light through their constituent parts and are widely used in optical data transfer and processing. There are two different types of electro optic modulators, electro-refraction modulators and electro-absorption modulators. Electro-refraction modulators rely on changes in the index of refraction of a material induced by an applied electric field to modulate the propagation of light through the modulator. One example of an electro-refraction modulator is based on a Mach-Zehnder interferometer. An incident light beam is split into two beams which propagate through the device on different paths and are subsequently recombined. An applied electric field alters the refractive index of the material along one of the paths to produce constructive or destructive interference when the beams are subsequently recombined.

Electro-absorption modulators achieve the desired light modulation by modifying the light absorbing properties of a material with an electric field. Materials comprising multiple quantum well (MQW) structures are particularly suitable for use in such devices because the Quantum Confined Stark Effect allows the energy levels of the material to be shifted by significantly lower voltages than those required for most other materials. These shifts can be used to alter the light absorbing properties of an MQW-based EOM at the wavelength of interest.

In order to be effective, electro-absorption modulators require materials that have good contrast between their on (transmit) and off (absorb) states and a small propagation insertion loss (loss in the on-state). The relationship between the transmission, T, length, l, and absorption coefficient, $\alpha$, of a material is given by T=exp [$-\alpha$l]. Electro-absorption modulators are constructed from materials having different absorption coefficients, $\alpha_0$, $\alpha_1$ in the on and off states, respectively. The contrast ratio of an electro-absorption modulator is the ratio of light transmission with the device on to the light transmission with the device off and is given by exp[$(\alpha_1-\alpha_0)$l]. The propagation insertion loss is related to the absorption coefficient in the on state, and is given by $-10 \log [\exp(-\alpha_0 l)]$ (dB).

Ideally, a material used in electro-absorption modulators has a relatively large value of $\alpha_1$ and a small value of $\alpha_0$ to provide both a low insertion loss and a high contrast ratio. These desirable characteristics lead to a figure of merit for electro-absorption modulators given by $(\alpha_1-\alpha_0)/\alpha_0$. In conventional electro-absorption modulators, the figure of merit is limited by the material parameters $\alpha_1$ and $\alpha_0$ and is typically less than 10.

SUMMARY OF THE INVENTION

The present invention is an electro-optic modulator having a figure of merit that is substantially greater than the figures of merit of conventional electro-absorption modulators. This improvement is achieved through an electro-optic modulator that utilizes both electro-absorption and electro-refraction effects to provide a high contrast between light transmission in the on and off-states and a low insertion loss in the on state.

Figure 2:
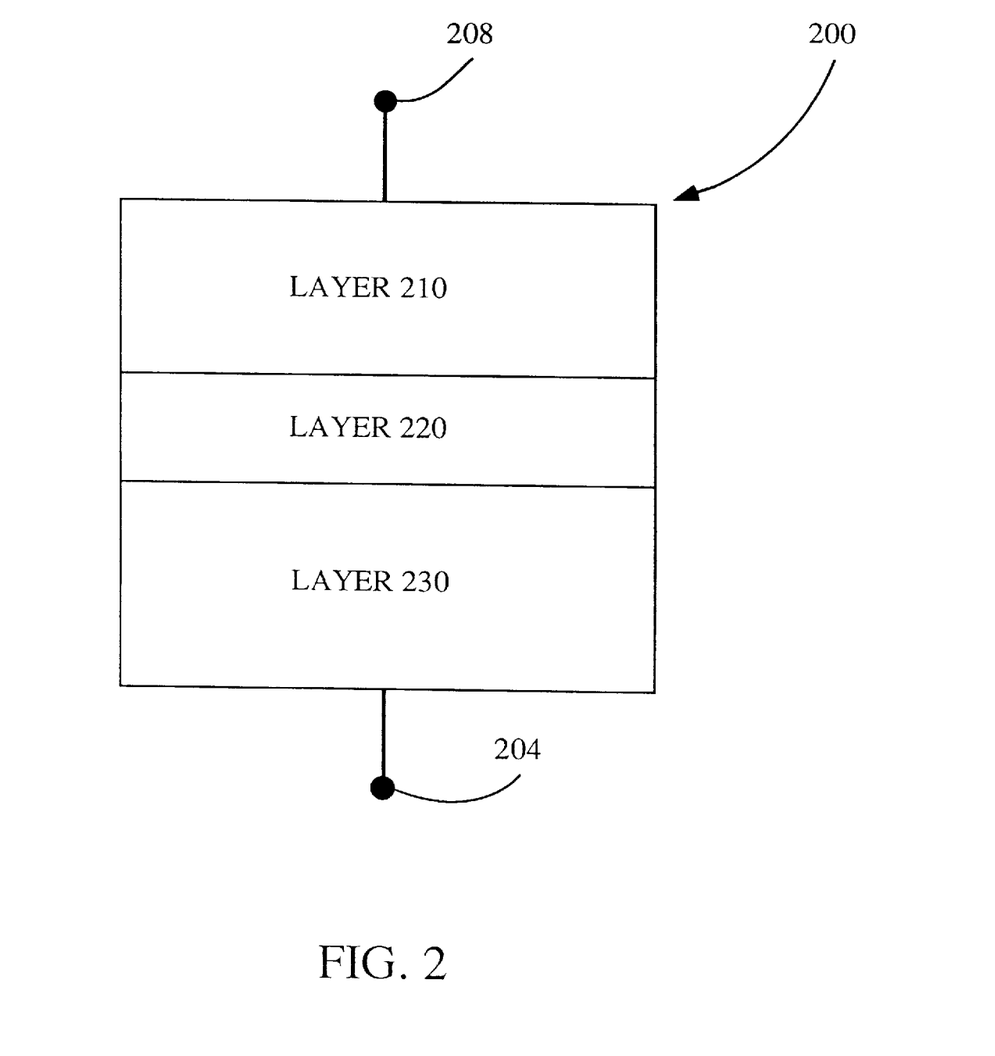
FIG. 2 is cross-sectional view of an electro-optic modulator in accordance with the present invention.

The present invention provides a waveguide modulator (200) in which a core layer (220) of a first material is sandwiched between two cladding layers (210, 230), at least one of which is a voltage tunable cladding layer formed from a multiple quantum well (MQW) material (230). The core material (220) is characterized by a low absorption coefficient and a refractive index that is substantially unchanged in the on and off-states for a selected wavelength of light. Typically, the core layer (220) is formed of a second MQW material in which the band gap and refractive index have been adjusted to produce the desired properties. The band gap and refractive index of the MQW cladding material are engineered to produce a cladding layer (230) having a refractive index that is less than that of the core refractive index in the on-state and that approaches or exceeds the core refractive index in the off-state.

The increase in the refractive index of the MQW cladding layer (230) in the off state is a consequence of a voltage induced shift in an exciton absorption that increases the absorption coefficient of the MQW cladding layer (230) at the selected wavelength. The consequent change in the refractive index of the cladding layer (230) relative to that of the core layer (220) reduces waveguiding, and the larger absorption coefficient increases light absorption in the cladding layer (230). The applied electric field thus causes a larger fraction of the light beam to travel in the highly absorbing cladding layer (230) in the off-state, while allowing the light to travel in the transparent core layer (220) in the on-state.

Figure 3:
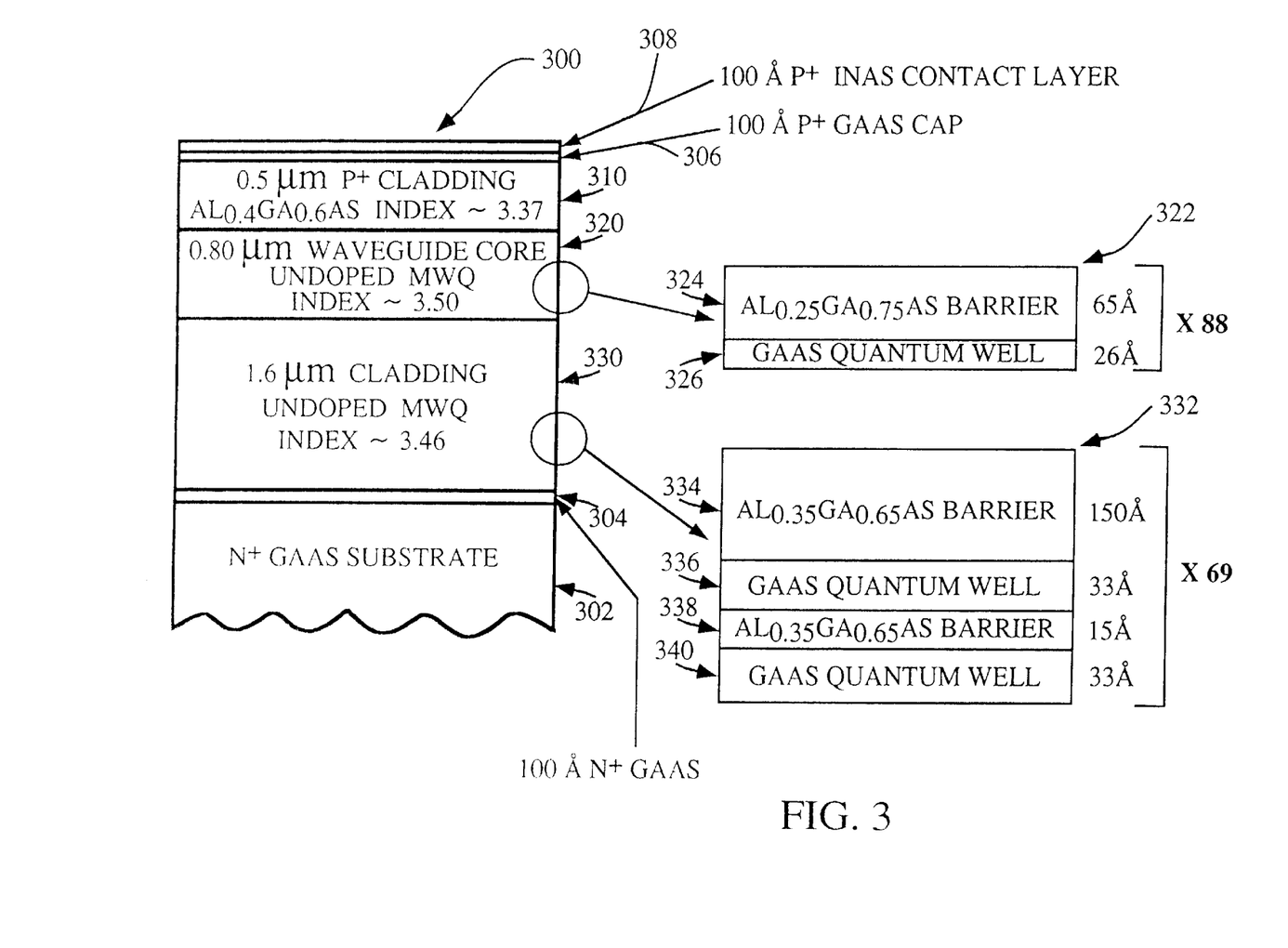
FIG. 3 is a detailed cross-section view of a modulator in accordance with the present invention.

In a preferred embodiment of the present invention, the composition and width of the quantum wells (326) and the barrier layers (324) of the MQW core material (322) are adjusted to provide a transparent core (320) with a first index of refraction at the selected wavelength. Similarly, the composition and width of the quantum wells (336, 340) and the barrier layers (334, 338) of the cladding material (332) are adjusted to provide an MQW cladding layer (330) having a lower index of refraction than the core layer (320) in the on state and a voltage tunable exciton absorption that can be shifted toward the selected wavelength by an applied voltage. In effect, the voltage dependence of the exciton absorption at the selected wavelength provides the cladding layer (330) with a voltage tunable refractive index.

In the on-state of an electro-optic modulator (200, 300) in accordance with the present invention, the electric field is adjusted to maintain the refractive index of the cladding layer (230, 330) below that of the core layer (220, 320). Light propagates through the transparent core (220, 320) of the waveguide and only minimally samples the cladding layer (230, 330), providing a small effective absorption coefficient for the on-state of the waveguide (200, 300). In the-off state, the applied voltage shifts the exciton absorption peak of the cladding layer (230, 330) nearer to the wavelength region of interest. The exciton absorption increases the absorption coefficient of the cladding layer (230, 330) and the concomitant increase in the refractive index of the cladding layer (230, 330) reduces waveguiding, allowing a substantially larger fraction of the light beam to sample the cladding layer (230, 330).

The large absorption coefficient of the waveguide in the off state is thus provided by the cladding layer (230, 330) by virtue of its exciton absorption, and the low absorption coefficient of the waveguide in the on state is provided by the transparent core layer (220, 320). Coupling of light between the core and cladding layers is controlled by an electric field through field-induced changes in the refractive index of the cladding layer, i.e. electro-refraction.

DETAILED DESCRIPTION OF THE PREFERRED EMBODIMENTS

Figure 1:
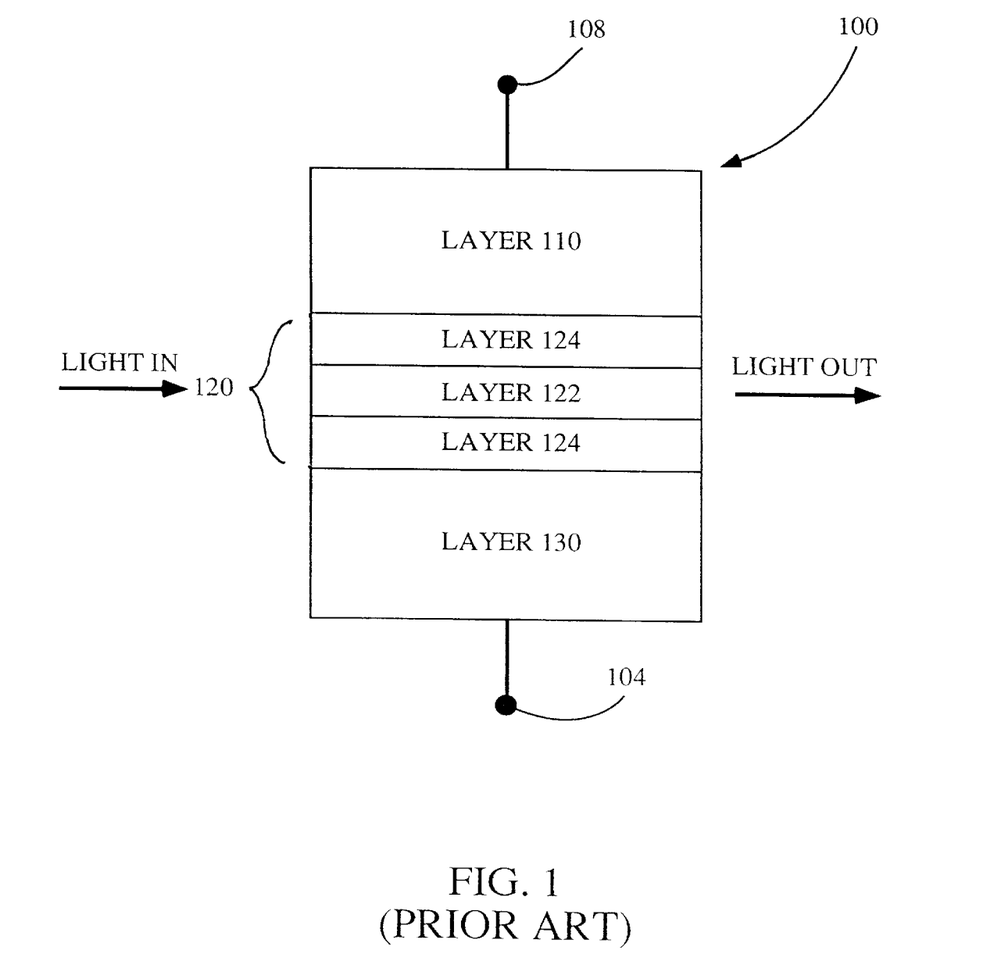
FIG. 1 is a cross-sectional view of a conventional electro-optic modulator.

Referring first to FIG. 1, there is shown a cross section of a conventional quantum well modulator 100 comprising an upper cladding layer 110, a lower cladding layer 130, and a core layer 120 that includes quantum well structures. Waveguiding is accomplished by selecting core layer 120 to have a higher refractive index than those of upper and lower cladding layers 110, 130. A pair of electrodes 104, 108 is bonded to cladding layers 130, 110, respectively, through doped layers (not shown) in order to apply an electric field across core layer 120. Modulation of light is achieved by shifting an exciton absorption in core layer 120 into and out of the wavelength region of interest through a varying voltage applied to electrodes 104, 108. The resulting increase and decrease, respectively, in the absorption coefficient of core layer 120 determines the contrast between the on and off states, and the absorption of core layer 120 in the on state determines the insertion loss for waveguide modulator 100.

One known modulator 100 has a core layer 120 comprising a 100 Å GaAs quantum well 122 sandwiched between two 180 Å wide GaAs/AlAs superlattice layers 124. Modulator 100 is disclosed in Bradley et al. App. Opt. 28, 1560 (1989), which is hereby incorporated by reference. Core layer 120 is sandwiched between upper and lower cladding layers 110, 130. Upper cladding layer 110 comprises p-doped (not shown) and undoped regions, with the undoped region adjacent to core layer 120. Similarly, lower cladding layer 130 comprises n-doped (not shown) and undoped regions, with the undoped region adjacent to core layer 120. With 4 V applied to electrodes 104, 108, the absorption coefficient of core layer 120 has a maximum of $\alpha_{11}$=4800 cm$^{-1}$ at $\lambda$=859 nm which drops to ($\alpha_{12}$=2500 cm$^{-1}$ at $\lambda$=862 nm. At V=0 volts, the absorption coefficients are $\alpha_{01}$=800 cm$^{-1}$ and $\alpha_{02}$=400 cm$^{-1}$ for $\lambda$=859 nm and 862 nm, respectively. The change in absorption coefficient is due to a shift in the exciton absorption with applied voltage. Based on these numbers, the propagation insertion loss, contrast ratio, and figure of merit at $\lambda$=859 nm for a 6 $\mu$m long device are 2.08 dB, 11.0, and 5.0, respectively, and the propagation insertion loss, contrast ratio, and figure of merit at $\lambda$=862 nm are 1.04 dB, 3.5, and 5.25, respectively.

It is noted that the refractive index of the material at $\mu$=862 nm is 0.01 greater at V=4 volts than at V=0 volts, due to the presence of the exciton absorption at 4 volts. However, the refractive indices of cladding layers 110, 130 are substantially smaller than that of core layer 120 and the waveguiding capability of modulator 100 is unaffected by this change. Thus, the performance of conventional electro-absorption waveguide modulator 100 is determined solely by the properties of core layer 120.

The performance limitations of conventional electro-absorption modulators 100 and the advantages of waveguide modulators 200 (FIG. 2) in accordance with the present invention, may be understood as follows. Consider a conventional waveguide modulator 100 which modulates light based on the absorpion properties of core layer 120. For core layer 120 having absorption coefficients $\alpha_0$, $\alpha_1$ in the on and off states, respectively, the figure of merit, $(\alpha_1-\alpha_0)/\alpha_0$, is determined solely by the optical properties of core layer 120, and is typically on the order of 10 or less. A second material characterized by absorption coefficients $\alpha_2$, $\alpha_3$ in the on and off-states, respectively, with $\alpha_2 \approx \alpha_3 << \alpha_0$, has a figure of merit $(\alpha_3-\alpha_2)/\alpha_2 \approx 0$.

A waveguide modulator in accordance with the present invention comprises a core material characterized by $\alpha_2$, $\alpha_3$ and a cladding material characterized by $\alpha_0$, $\alpha_1$ and switches light between the core and cladding materials in the on and off-states, respectively. The figure of merit for such a waveguide modulator is then $(\alpha_1-\alpha_2)/\alpha_2$ which is substantially larger than the figures of merit obtainable with either material alone. A waveguide modulator (200) employing this structure is described below and is also described in Harwit, et al., *Light Propagation, optical modulation, and beam steering in Waveguides With Quantum Well Voltage Tunable Claddings*, App. Phys. Lett. 66 (5), 30 Jan. 1995, which is hereby incorporated by reference.

Referring now to FIG. 2, there is shown an embodiment of waveguide modulator 200 in accordance with the present invention. Waveguide modulator 200 comprises an upper cladding layer 210, a core layer 220, and a MQW lower cladding layer 230. As noted above core layer 220 is typically, but not necessarily, a MQW material and will be referred to as an MQW core layer for the remainder of this discussion.

The structure and compositions of MQW core and lower cladding layers 220, 230, respectively, are adjusted to ensure that MQW core layer 220 has a band gap and refractive index which are larger than the band gap and refractive index, respectively, of MQW cladding layer 230 in the modulator on-state. In one embodiment, quantum wells and barriers are repeatedly stacked to form a 2 $\mu$m thick transparent MQW core layer 220 having a refractive index of 3.51 and an $\alpha_0$ that is two or more orders of magnitude less than $\alpha_1$ of MQW cladding layer 230. For lower MQW cladding layer 230, the structure and composition of the quantum wells and barriers are comparable to those of core layer 120 (FIG. 1) which are repeated to form a cladding layer 230 that is significantly thicker than 2 $\mu$m. The relative thicknesses of core and cladding layers 220, 230 determine in part the fraction of light traveling in high absorption cladding layer 230, when modulator 200 is in the off-state. The nominal refractive index of MQW cladding layer 230 is 3.50 in the absence of an electrical field and increases to 3.51 when a potential of 4 volts is applied across electrodes 204, 208. Upper cladding layer 210 has a refractive index of 3.40, which is unaffected by the applied voltages.

In the absence of an electric field, the fraction of power carried in MQW cladding layer 230 can be shown to be approximately 7.9% of the total power, and since MQW core 220 is essentially transparent at the selected wavelength, substantially all light absorption may be attributed to losses in cladding layer 230. This results in an effective absorption coefficient of $\alpha_{0,\mathit{eff}}$ of 31.6 cm$^{-1}$ (0.079*400 cm$^{-1}$). When the electric field is turned on, the Quantum Confined Stark Effect shifts the exciton absorption at $\mu$=862 nm, increasing the absorption coefficient of MQW cladding layer 230 and increasing its refractive index to be closer to that of core layer 220. The structure of MQW core layer 220 is engineered to have an exciton absorption peak at a significantly shorter wavelength, so that its absorption at 862 nm is negligible and is not implicated by the voltage level shift. The change in the index of refraction of MQW cladding layer 230 reduces waveguiding and allows the light to sample MQW cladding layer 230. For relatively thin core layer 220 and approximately equal refractive indices for core and cladding layers 220, 230 in the off state, it may be assumed that nearly all light is carried in cladding layer 230, and $\alpha_{1,\mathit{eff}} \approx \alpha_1$=2500 cm$^{-1}$.

The reduction in waveguiding in the off-state of modulator 200 depends on how closely the refractive index of cladding layer 230 approaches that of core layer 220 in the off state. Some residual waveguiding is likely when the refractive index of cladding layer 230 in the off-state is less than that of core layer 220. On the other hand, light energy should be distibuted uniformly through core and cladding layers 220, 230, respectively, when the indices are approximately equal in the off state. Waveguide modulater 200 will be operative as long as the refractive index of cladding layer 230 is closer to or exceeds that of core layer 220 in the off-state.

Waveguide modulator 200 in accordance with the present invention thus provides a lower value of $\alpha_{0,\mathit{eff}}$ without significantly altering the value of $\alpha_{1,\mathit{eff}} \approx \alpha_1$=2500 cm$^{-1}$. This allows for higher contrast ratios with simultaneously lower insertion losses as shown numerically below. In addition, the low value of $\alpha_{0,\mathit{eff}}$ allows a longer waveguide to be used to increase the amount of light absorbed in the off-state without significantly decreasing the intensity of light transmitted in the on-state. For a 30 $\mu$m long waveguide modulator 200, the insertion loss is 0.41 dB (–10 log [exp (–$\alpha_{0,\mathit{eff}}$1)]) and the contrast ratio is 1645 (exp [($\alpha_{1,\mathit{eff}}$–$\alpha_{0,\mathit{eff}}$)1]). This represents a reduction in the insertion loss of 1.67 dB over that of conventional modulator 100 (operating at 859 nm) and a simultaneous increase in the contrast ratio by a factor of 150. The figure of merit of waveguide modulator 200 is 78, indicating a substantial improvement in performance of waveguide modulator 200 over that of conventional modulator 100.

One key to designing waveguide modulators 200 is the selection of materials for core and cladding layers, 220, 230, respectively, having refractive indices and band gaps suitable for voltage control of waveguiding. The composition and structure of suitable materials may be determined by a number of known methods. For example, the band gap of an MQW material is the sum of the band gap of the well material and the quantum confined energy of the quantum well. The first property depends on the well material, which is typically GaAs. The second property depends on the width of the quantum well, and the material of the quantum well and the barrier. Quantum confined energies may be determined by methods such as those described in G. Bastard, *Wave Mechanics Applied to Semiconductor Heterostructures*, Wiley, (1991), C. Kittel, *Introduction to Solid State Physics*, 5th Ed., Wiley, New York, 1976, Bastard et al. Phys. Rev. B, 28, p. 3241 (1983), and Harwit et al., J. Appl. Phys. 60, p. 3211 (1986), which are hereby incorporated by reference.

The bandgaps of Al(x)Ga(1–x)As for various mole fractions (x) are available from tables such as those in E. Palik (ed.) *Handbook of Optical Constants of Solids*, Academic, Orlando, 1985, and *Handbook of Optical Constants of Solids II*, Academic, Boston, (1991), which are hereby incorporated by reference. These references also list the refractive indices for GaAs, AlAs, and specific mole fractions of Al(x)Ga(1–x)As as functions of wavelength.

The refractive index for an MQW layer, comprising layers of different composition and well width, is approximately equal to the refractive index for a film of Al(x)Ga(1–x)As, where x is the average Al mole fraction in the MQW layers. Alternatively, the refractive index of an MQW layer may be taken as the weighted sum of a refractive index determined from the band gap of the quantum well and the refractive index of the barrier. In this case, the band gap for the quantum well is first determined and the refractive index is taken as that of the composition, Al(x)Ga(1–x)As, having the same band gap. These are then weighted according to the relative amounts of quantum well and barrier material in the MQW layer. The added refractive index associated with the exciton absorption in the quantum well may be computed using the Kramers-Kronig relationship and the quantum well absorption spectrum, as disclosed for example in J. Pankov, *Optical processes in Semiconductors*, Dover, New York, (1975), which is hereby incorporated by reference.

Referring now to FIG. 3, there is shown a cross-section of another embodiment of a waveguide modulator 300 in accordance with the present invention. Waveguide modulator 300 comprises an upper cladding layer 310, a MQW core layer 320, and a lower MQW cladding layer 330 having a different MQW structure from core layer 320. In the disclosed embodiment, all layers are deposited on an n$^+$ doped GaAs substrate 302 that includes a 100 Å buffer layer 304 of n$^+$ doped GaAs. A 100 Å cap layer 306 of p$^+$ doped GaAs is deposited over upper cladding layer 310 and a 100 Å p$^+$ doped InAs contact layer 308 is deposited over cap layer 306 to provide an attachment surface for an electrical contact (not shown).

On the right hand side of FIG. 3, there are shown exploded views of unit MQW structures 322, 332 which are repeated to form MQW core and cladding layers 320, 330, respectively, in the disclosed embodiment of the present invention. Core MQW structure 322 comprises a 65 Å barrier layer 324 of Al$_{0.25}$Ga$_{0.75}$As and a 26 Å GaAs quantum well 326. In the disclosed embodiment of the invention, MQW core 320 comprises 88 repeated core MQW structures 322. This provides a waveguide core layer 320 approximately 0.80 $\mu$m thick and having an index of refraction of approximately 3.50.

Cladding MQW structure 332 comprises a 150 Å barrier layer 334 of Al$_{0.35}$Ga$_{0.65}$As, a 33 Å GaAs quantum well 336, a 15 Å barrier layer 338 of Al$_{0.35}$Ga$_{0.65}$As, and a second 33 Å GaAs quantum well 340. In the disclosed embodiment of the invention, MQW cladding 330 comprises 69 repeated MQW cladding structures 332. This provides a lower cladding layer 330 approximately 1.6 $\mu$m thick and having an index of refraction of approximately 3.46. In the disclosed embodiment, upper cladding layer 310 is 0.5 $\mu$m thick p$^+$ doped Al$_{0.4}$Ga$_{0.6}$As, having an index of refraction of approximately 3.37.

Key to the operation of waveguide modulator 300 are the relative magnitudes of the indices of refraction of core and cladding layers 320, 330 and the relative sizes of their band-gaps. As noted above, both the band gap and index of refraction of MQW cladding layer 330 must be smaller than the band gap and refractive index, respectively, of MQW core layer 320 in the modulator on-state in order to ensure better transmission for core layer 320 and proper waveguiding in modulator 300. Accordingly, the widths of quantum wells 336 are increased from 26 Å in MQW core layer 320 to a coupled pair of 33 Å wells in MQW cladding layer 330 to reduce the band gap of MQW cladding layer 330 relative to that of MQW core layer 320. Simultaneously, 65 Å $Al_{0.25}Ga_{0.75}As$ barrier 324 in MQW core layer 320 is changed to 150 Å $Al_{0.35}Ga_{0.65}As$ and 15 Å $Al_{0.35}Ga_{0.65}As$ barriers 334, 338, respectively, in MQW cladding layer 330. This increase in the thickness and/or aluminum mole fraction of barrier 334, 338 reduces the refractive index of MQW cladding layer 330 relative to that of MQW core layer 320, while the increase in the quantum well width reduces its band gap.

Figure 4:
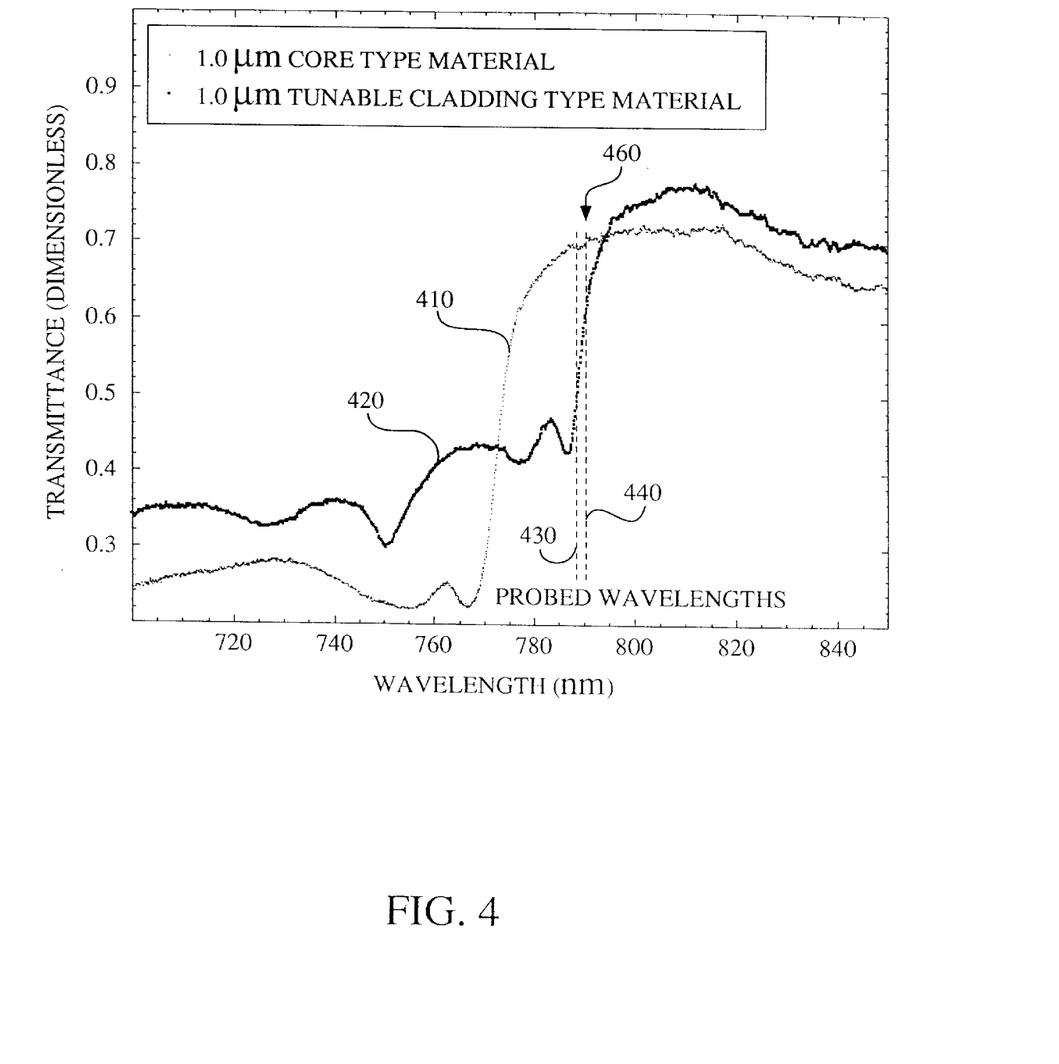
FIG. 4 is a plot of the transmittances of core and cladding materials of the electro-optic modulator of FIG. 3.

Referring now to FIG. 4, there are shown room temperature transmission spectra 410, 420 of 1 μm thick films of the materials from which MQW core layer 320 and MQW cladding layer 330, respectively, are formed. Wavelengths 788.35 nm and 790.5 nm indicated by vertical dashed lines 430, 440, respectively, are at edge 460 of an exciton absorption in cladding layer 330, where core layer 320 remains transparent. Changes in the refractive index of cladding layer 330 are related to the indicated exciton absorption through the Kramers-Kronig relations, and these changes are on the order of 0.03 to 0.05 in the disclosed material. In addition, the Quantum Confined Stark Effect allows the position of exciton absorption edge 460 to be shifted to longer wavelengths by application of a relatively low potential difference (voltage) between $n^+$ doped GaAs substrate 302 and $p^+$ doped InAs contact layer 308. This in turn allows the waveguiding action and absorption characteristics of modulator 300 to be turned on and off under control of an applied voltage.

Figure 5A:
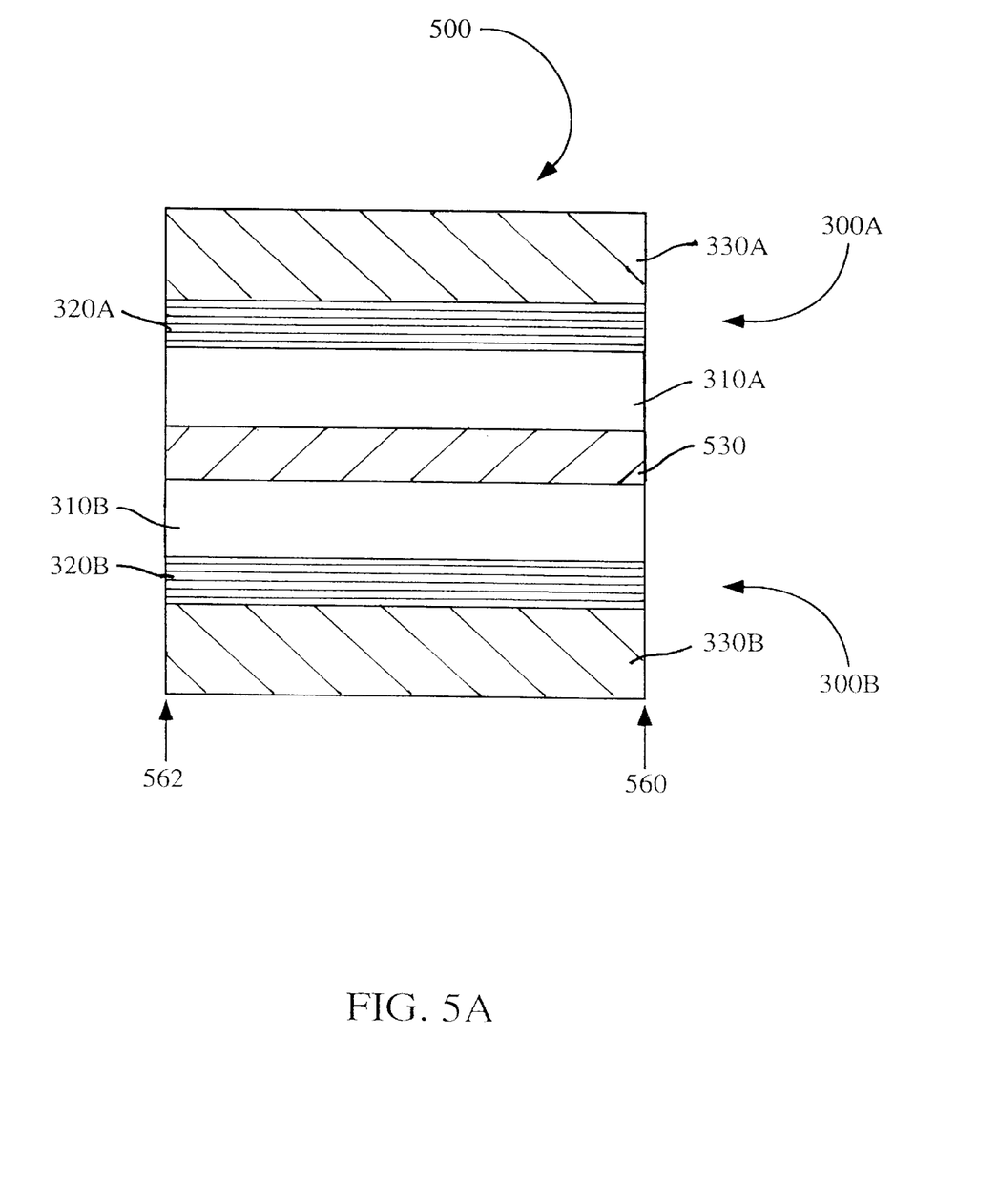
FIG. 5A is a cross-sectional view of a beam steering device comprising a pair of the electro-optic modulators of FIG. 3.

The waveguiding capability of structures including cladding and core layers 330, 320, respectively, are demonstrated by devices that incorporate MQW core and cladding layers 320, 330, respectively. Referring now to FIG. 5A there is shown a block diagram of a beam-steering device 500 comprising a pair of waveguide modulators 300a, 300b bonded epi-side to epi-side ($p^+$ side to $p^+$ side) with conductive epoxy 530 to form back to back diodes. In device 500, core layers 320a, 320b of waveguide modulators 300a, 300b are separated by 4.3 μm. A 115 μm long waveguide section of device 500 was cut, and faces 560, 562 were polished so that each modulator 300a, 300b formed a Fabry-Pérot modulator.

The beam steering capability of device 500 was demonstrated by illuminating it with 10.9 mW of 790.5 nm light from a diode laser and monitoring the amplitudes of light exiting device 500 for changes with applied voltage. The amplitude of the near-field signal intensity from each waveguide 300 as a function of applied voltage was monitored using a microscope. Without any optimization of MQW core and cladding materials 320, 330, a contrast ratio of 4 to 1 was obtained for beam steering device 500 at an applied voltage of 12 V, demonstrating intensity modulation of individual light signals using an electric field.

Far field intensity patterns were observed on a ground plastic screen placed 4.3 cm in back of waveguides 300a, 300b to monitor the beam steering properties of beam steering device 500. These intensity patterns exhibited a two slit interference pattern consisting of four lobes spaced approximately 8 mm apart with full widths at half maximum (FWHMs) of 4 mm.

Figure 5B:
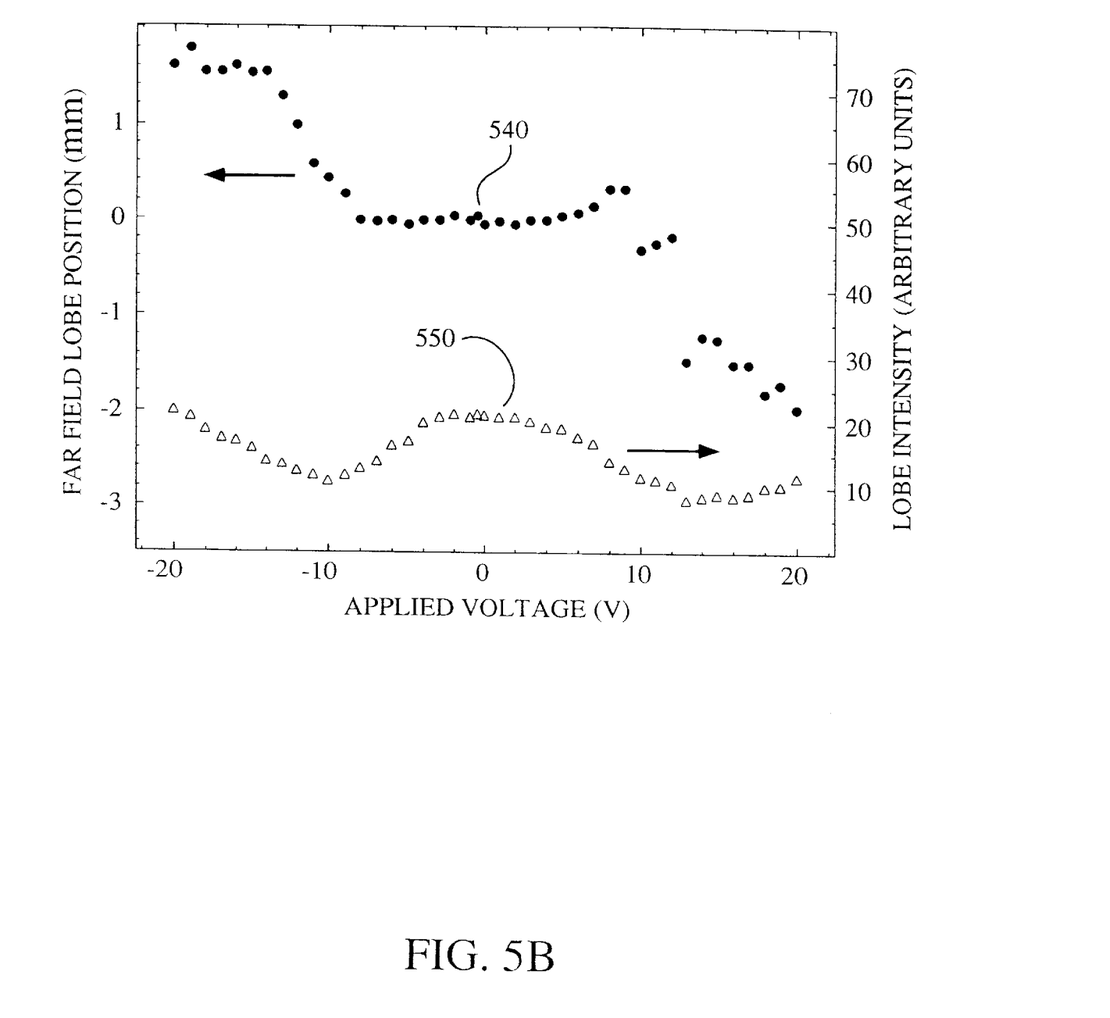
FIG. 5B is a plot of the position and intensity of a far field lobe of light transmitted through the beam steering device of FIG. 5A as a function of the voltage applied to the device.

Referring now to FIG. 5B, there are plotted curves 540, 550 of the position and intensity, respectively, of one lobe of the far field pattern as a function of the applied voltage. The position shift is consistent with a beam angle shift of 2.4° with an applied voltage of 20 volts and demonstrates the beam steering capability of device 500.

The light channeling ability of waveguide modulator 300 was further demonstrated by examining the waveguide optical modes as a function of applied voltage for a 611 μm long waveguide 300, cut and polished to form a single Fabry-Pérot modulator. The modulator was illuminated with 788.35 nm radiation and the far field intensity pattern, which is related to the square of the Fourier transform of the modal field distribution, was examined as a function of applied voltage.

Figure 6:
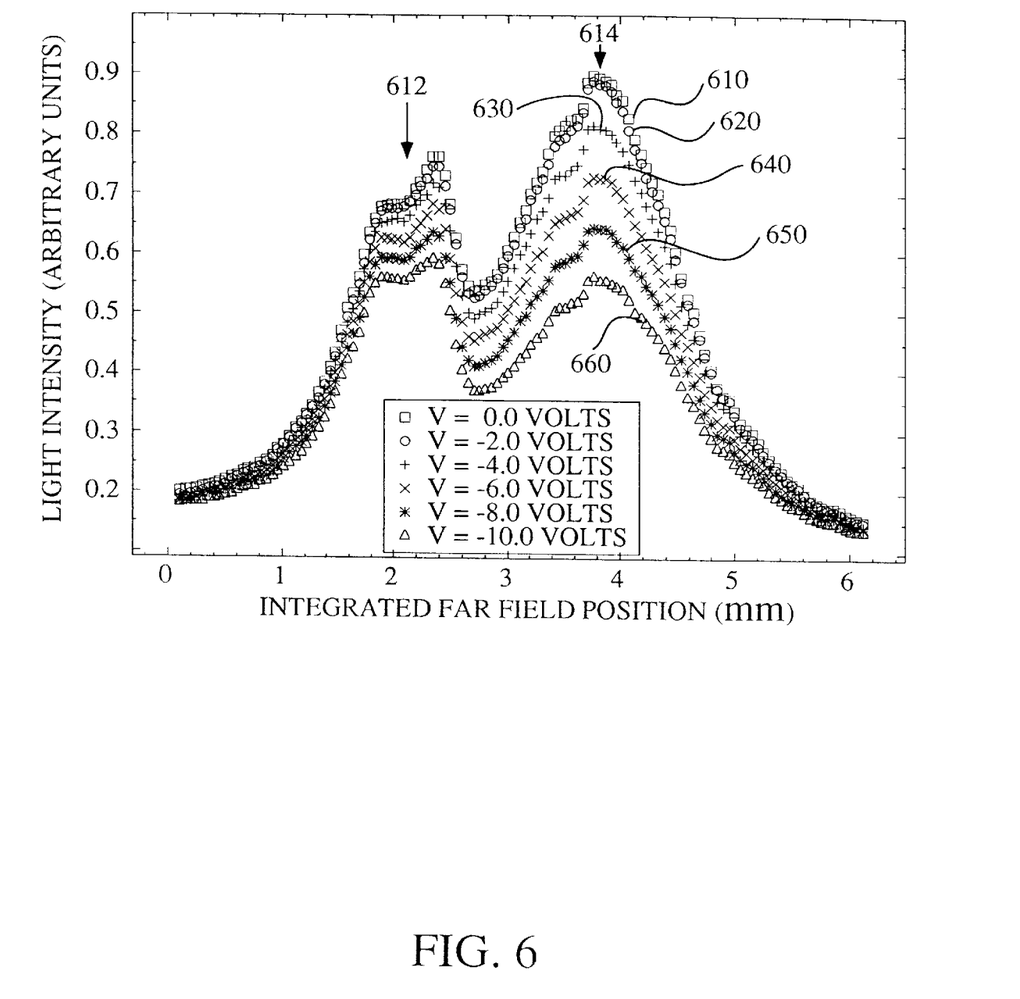
FIG. 6 is a plot of the far field light intensity as a function of the integrated far field position, for different voltages applied to the electro-optic modulator of FIG. 3.

Referring now to FIG. 6, there are shown plots 610, 620, 630, 640, 650, 660 of far field intensity patterns as a function of applied voltage for 611 μm long waveguide 300 (low voltage plots 610, 620 overlap substantially). Plots 610–660 are obtained from 2D intensity plots in x and y by integrating the intensities with respect to y and plotting them as a function of x. Plot 610, a far field pattern at 0 volts, consists of distinct lobes 612, 614 of unequal intensity, indicative of the first excited mode of an asymmetric waveguide. Lobes 612, 614 have an angular separation of approximately 9°, which is slightly less than that which would be expected for a slab waveguide laser of similar dimensions and may be due in part to coupling of the waveguide mode to the substrate.

Applied reverse biases between 0 and 10 volts significantly change the shape of the far field intensity patterns, as indicated by plots 610, 620, 630, 640, 650, 660, with the intensity of lobe 614 dramatically decreasing relative to that of lobe 612 as the applied voltage is increased. This change in the modal structure with applied voltage demonstrates changes in the distribution of light traveling in MQW core and cladding layers 320, 330. Optimization of the properties of MQW cladding and core materials 330, 320 should lead to contrast ratios and figures of merit that approach those indicated in the discussion of model system 200 shown in FIG. 2.

There have thus been disclosed a system and method for electro-optically modulating light using both electro-absorption and electro-refraction effects. A waveguide is formed from MQW cladding and core materials, the properties of which have been engineered to allow light to be redistributed between the MQW cladding and core layers under control of an applied potential. The transparent MQW core material is engineered to have a low absorption coefficient in the on state. The MQW cladding material is engineered to have a strong exciton absorption at the wavelength of interest in the off-state. The change in the refractive index of the cladding material that accompanies the exciton absorption funnels light into the high absorption cladding material in the off state. By tuning the light absorbing properties of the core and cladding layers and taking advantage of the refractive index change in the cladding layer induced by an applied electric field, the present invention allows the effective absorption coefficients of the waveguide to be adjusted independently of single material properties for the on and off-states. This provides greater flexibility than conventional electro-absorption modulators that rely on the light absorbing properties of a single material, and allows simultaneous improvement in both the contrast ratio and insertion loss of the modulator.

These and other variations upon and modifications to the described embodiments are provided for by the present invention, the scope of which is limited only by the following claims.

What is claimed is:

1. An electro-optic waveguide modulator comprising:

a first cladding layer having a first refractive index:

a core layer adjacent to the first cladding layer and having a second refractive index that is greater than the first refractive index, the core layer being substantially transparent to light at a selected wavelength: and a second cladding layer adjacent to the core layer, the second cladding layer having a voltage tunable refractive index and a voltage tunable absorption at the selected wavelength, the voltage tunable refractive index being less than the second refractive index in a first voltage state and being increased to a value closer to the second refractive index in a second voltage state, for shifting light at the selected wavelength between the core and cladding layers in response to an applied electric field.

2. The electro-optic waveguide modulator of claim 1, wherein the voltage tunable refractive index is between 1.0 and 0.0005 less than the second refractive index in the first voltage state.

3. The electro-optic waveguide modulator of claim 1, wherein the core and cladding layers are first and second multi-quantum well materials.

4. The electro-optic waveguide modulator of claim 3, wherein the first multi-quantum well material comprises a first multi-layer of aluminum gallium arsenide barrier layers alternating with a quantum well material selected from the group comprising gallium arsenide and aluminum gallium arsenide.

5. The electro-optic waveguide modulator of claim 4, wherein the second multi-quantum well material comprises a second multilayer of aluminum gallium arsenide barrier layers alternating with a quantum well material selected from the group comprising gallium arsenide and aluminum gallium arsenide.

6. The electro-optic waveguide modulator of claim 1, wherein the first refractive index of the first cladding layer is a voltage tunable refractive index that is less than the second refractive index in a first voltage state and that is increased to a value that is closer to the second refractive index in the second voltage state.

7. An electro optic waveguide modulator comprising:

a first cladding layer having a first refractive index:

a core layer adjacent to the first cladding layer and having a second refractive index that is greater than the first refractive index, the core layer being substantially transparent to light at a selected wavelength: and a second cladding layer adjacent to the core layer, the second cladding layer having a voltage tunable refractive index and a voltage tunable absorption at the selected wavelength, the voltage tunable refractive index being less than the second refractive index in a first voltage state and being increased to a value closer to the second refractive index in a second voltage state, for shifting light at the selected wavelength between the core and cladding layers in response to an applied electric field wherein the voltage tunable refractive index is between 0.04 and 0.01 less than the second refractive index in the first voltage state.

8. An electro-optic waveguide modulator comprising:

a first cladding layer having a first refractive index:

a core layer adjacent to the first cladding layer and having a second refractive index that is greater than the first refractive index, the core layer being substantially transparent to light at a selected wavelength: and a second cladding layer adjacent to the core layer, the second cladding layer having a voltage tunable refractive index and a voltage tunable absorption at the selected wavelength, the voltage tunable refractive index being less than the second refractive index in a first voltage state and being increased to a value closer to the second refractive index in a second voltage state, for shifting light at the selected wavelength between the core and cladding layers in response to an applied electric field wherein the core and cladding layers are first and second multi-quantum well materials, the first multi-quantum well material comprises a first multilayer of aluminum gallium arsenide barrier layers alternating with a quantum well material selected from the group comprising gallium arsenide and aluminum gallium arsenide and the first multilayer comprises a plurality of first multilayer units, each unit including a 65 Å wide $Al_{0.25}Ga_{0.75}As$ barrier layer and a 26 Å wide gallium arsenide quantum well, and the second multi-quantum well material comprises a second multilayer of aluminum gallium arsenide barrier layers alternating with a quantum well material selected from the group comprising gallium arsenide and aluminum gallium arsenide.

9. The electro-optic waveguide modulator of claim 8, wherein the second multilayer comprises a plurality of second multilayer units, each unit comprising a 150 Å wide $Al_{0.35}Ga_{0.65}As$ barrier layer, a first 33 Å wide gallium arsenide quantum well, a 15 Å wide $Al_{0.35}Ga_{0.65}As$ barrier layer, and a second 33 Å wide gallium arsenide quantum well.

10. The electro-optic waveguide modulator of claim 9, wherein the core layer comprises 88 first multilayer units and the second cladding layer comprises 69 second multilayer units.

11. A waveguide modulator comprising:

a first cladding layer comprising a multi-channel quantum well material having an exciton absorption at a first wavelength in a first voltage state and at a second wavelength in a second voltage state, the exciton absorption causing the first cladding layer to have a first refractive index at a third wavelength in the first voltage state and an incremented refractive index at the third wavelength in the second voltage state, the third wavelength being nearer the second wavelength than the first wavelength;

a core layer comprising a multi-quantum well material characterized by a second refractive index at the third wavelength that is substantially unchanged in the first and second voltage states, the core layer being substantially transparent to light at the third wavelength; and a second cladding layer having a third refractive index at the third wavelength that is less than the second refractive index, the first and second cladding layers substantially confining light of the third wavelength in the core layer in the first voltage state and the first cladding layer allowing light of the third wavelength to escape from the core layer in the second voltage state.

12. The waveguide modulator of claim 11, wherein the second cladding layer has an exciton absorption at a fourth wavelength in a first voltage state and at a fifth wavelength in a second voltage state, the exciton absorption causing the second cladding layer to have the third refractive index at a third wavelength in the first voltage state and an incremented refractive index at the third wavelength in the second voltage state.

13. The waveguide modulator of claim 12, wherein the first and second cladding layers are identical.

14. A method for modulating the intensity of light at a selected wavelength that is transmitted through a waveguide comprising a first cladding layer, a multi quantum well core layer characterized by a core refractive index, and a multi quantum well cladding layer having a voltage tunable exciton absorption to provide the multi quantum well cladding layer with a first refractive index that is less than the core refractive index when a first voltage is applied across the waveguide and a second, larger refractive index when a second voltage is applied across the waveguide, the method comprising the steps of:

directing light at the selected wavelength into the core layer of the waveguide;

applying the first voltage to the waveguide to confine the light substantially to the core layer for transmission through the waveguide at a first intensity; and applying the second voltage to the waveguide to allow the light to sample the voltage tunable cladding layer and to reduce the intensity of light transmitted through the waveguide.

15. A method for forming an electro-optic waveguide modulator, the method comprising the steps of:

forming a core layer of the waveguide from a multi-quantum well material that is transparent to light at a selected wavelength and characterized by a core refractive index at the selected wavelength;

forming a cladding layer adjacent to the core layer; the cladding layer having a cladding refractive index that is less than the core refractive index at the selected wavelength; and adjacent to the core layer and opposite the cladding layer, forming a voltage tunable layer from a multi-quantum well material having a first refractive index that is less than the core refractive index at the selected wavelength when a first voltage is applied to the waveguide and a second refractive index that is greater than the first refractive index at the selected wavelength when a second voltage is applied and having a voltage tunable absorption.

16. The method of claim 15, wherein the step of forming a cladding layer comprises forming a voltage tunable cladding layer from a multi quantum well material having the cladding refractive index at the selected wavelength when a first voltage is applied to the waveguide and having a larger refractive index at the selected wavelength when a second voltage is applied.

* * * * *